No. 895,360. PATENTED AUG. 4, 1908.
J. R. GAMMETER.
VEHICLE WHEEL RIM.
APPLICATION FILED JUNE 9, 1906.

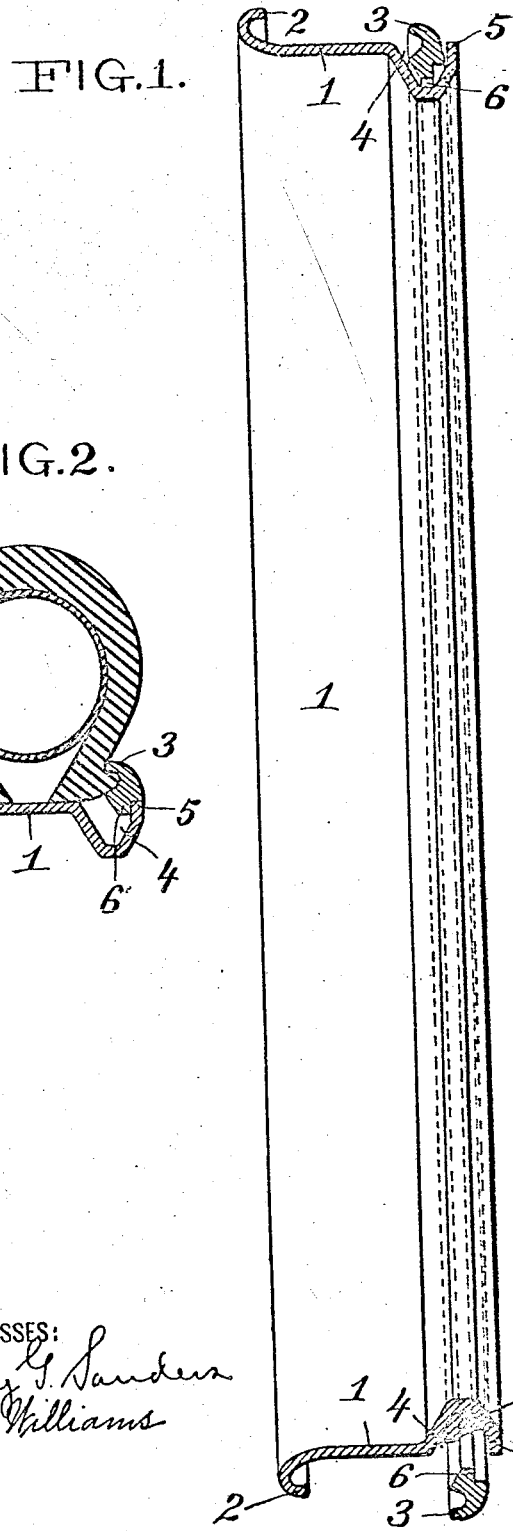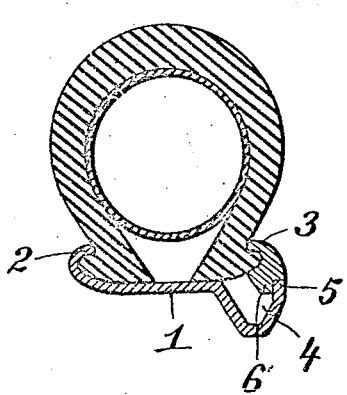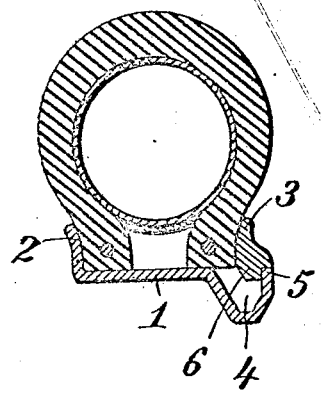

2 SHEETS—SHEET 2.

WITNESSES:

INVENTOR
John R. Gammeter
BY
Seward Davis
ATTORNEY

UNITED STATES PATENT OFFICE.

JOHN R. GAMMETER, OF AKRON, OHIO, ASSIGNOR TO B. F. GOODRICH COMPANY, OF AKRON, OHIO, A CORPORATION OF OHIO.

VEHICLE-WHEEL RIM.

No. 895,360.  Specification of Letters Patent.  Patented Aug. 4, 1908.

Application filed June 9, 1906. Serial No. 320,939.

*To all whom it may concern:*

Be it known that I, JOHN R. GAMMETER, a citizen of the United States, residing in the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of wheel rims adapted for use with tires of resilient material, and more particularly to rims intended for use with detachable tires.

The object of my invention is to provide a rim having one or both the tire-retaining flanges removable to enable the tire to be quickly and easily applied or removed.

A further object of my invention is to provide means for securing a tire-retaining flange in the operative position without employing bolts, nuts, turn-buckles or other locking devices which tend to weaken a structure of this character.

Figure 4:
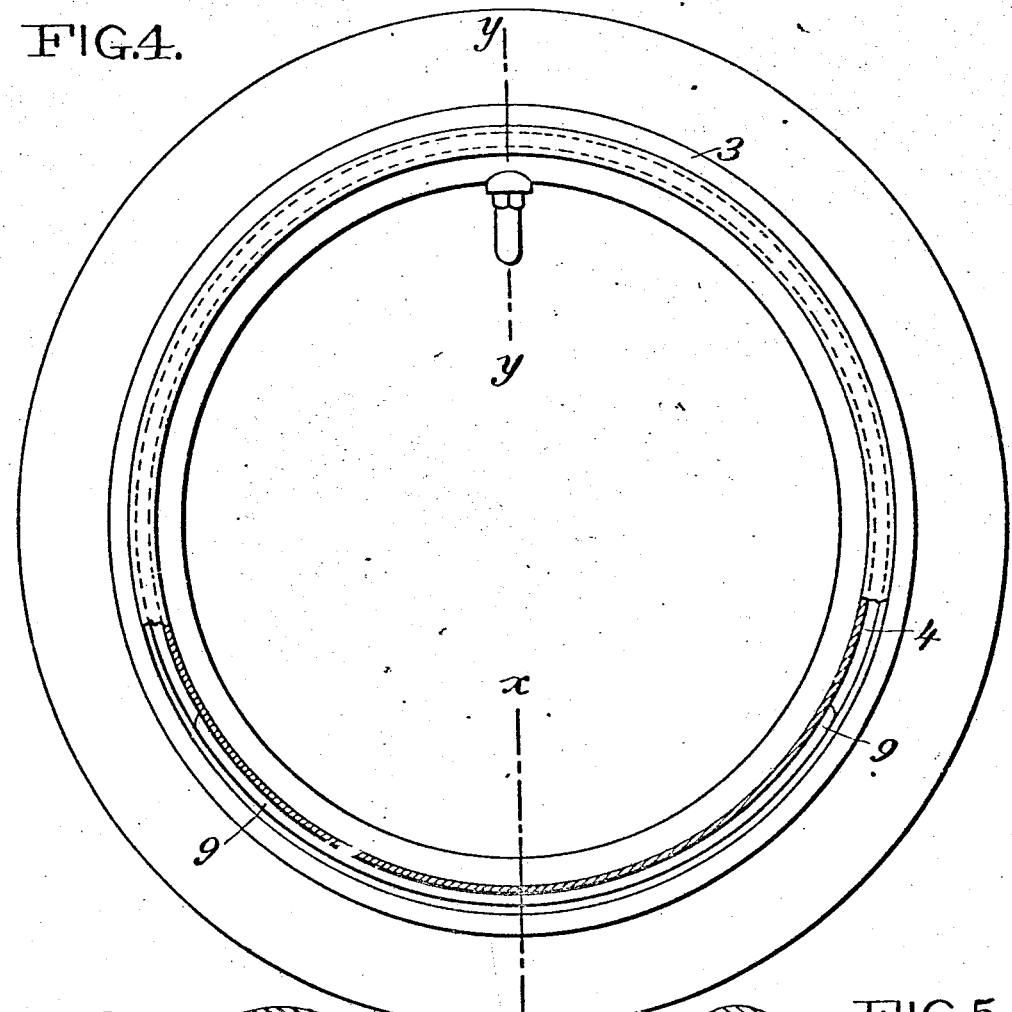
Figure 6:
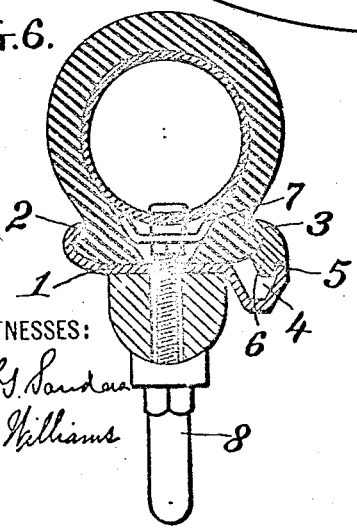
Figure 5:
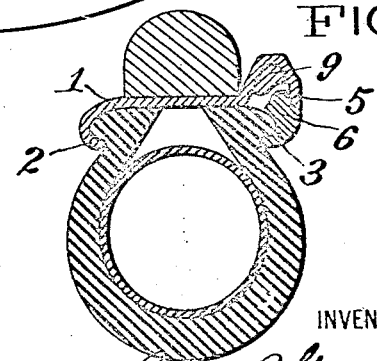

Referring to the drawings, Figure 1 is a view of a portion of the rim and detachable flange partially in section, illustrating the method of attaching and detaching the removable flange. Fig. 2 is a cross-section of a tire and rim showing the device in the locked position as applied to a tire and rim of the clencher type. Fig. 3 is a similar view showing the device as applied to a tire of the so-called Dunlop type. Fig. 4 is a side view of a felly, rim and tire embodying my improvements, a part being broken away to show the "filling lug" which I use to prevent the disengagement of the parts in the event of accidental deflation of the tire. Fig. 5 is a cross section along the line x—x of Fig. 4. Fig. 6 is a cross section along the line Y—Y of Fig. 4 showing the method of attaching the retaining clip to the valve stem.

Throughout the drawings like reference numerals refer to like parts.

The rim proper or tire seating member 1 is preferably constructed of metal and is usually shrunk on the wheel felly or secured thereto by bolts. The tire-retaining flange 2 in the construction which I use at present is integral with the member 1. The opposing tire retaining flange 3 is mounted or formed upon an endless removable ring 6. Along the edge of the tire seating member which supports this flange is an annular groove 4 of proper shape and dimensions to permit the flange-ring to drop partially within it. The outer wall of this groove I prefer to construct with its upper edge 5 on a level with the tire-seating portion of the rim in order to permit the tire to be easily slipped over it. The flange 3 is shaped to correspond with the opposite tire flange 2 and the form of both may be varied at will to adapt them for use with any desired style of tire.

The inner diameter of the flange-ring 6 is slightly less than the diameter of the circle formed by the upper edge 5 of the exterior wall of the groove 4. This flange-ring is inextensible, and in order to permit it to be applied or removed over the edge of the groove 4 it should be constructed so that it is capable of distortion. The degree of distortion necessary will be found to be very slight, and consequently the ring may be made of considerable cross-section, amply sufficient to withstand any strain to which it is subject. The form of the flange-ring may be varied considerably, but I prefer to groove it, as shown, so that it will seat upon the edge of the wall 5, or to chamfer the ring 6 and the edge 5 to mutually correspond.

Under any ordinary circumstances the inflation of the tire will hold the removable flange in engagement and the structure as heretofore described will be found satisfactory but in the event of a sudden accidental deflation of the tire as in the case of a puncture the parts may become disengaged, allowing the removable ring to drop off. To guard against this difficulty the ordinary clips may be used but I prefer the combination of devices shown in Figs. 1, 4, 5 and 6. I employ a single clip 7 which is mounted upon the stem of the tire-valve (Fig. 6). This clip may conveniently consist of a metal plate punched to receive the valve stem and provided with two oppositely disposed projections which are upwardly and outwardly inclined. These projections are properly shaped and located to seat against the inner surfaces of the tire edges. Thus when the tire and retaining ring are in position and the valve stem is drawn downward by means of the dust cap 8 or equivalent means the tire edge is forced outward against the retaining ring which is thus firmly held against disengagement. To provide still further protection I provide the "filling lug" 9. This "filling lug" consists simply of a mass of metal or other suitable material lying within and partially filling the groove for a portion of its length. It may fill the entire depth of the groove with the exception of the part occupied by the projection of the flange-ring when in the assembled position. It must be of sufficient depth to prevent the ring dropping within the groove sufficiently to allow the said ring to be removed. The length of this lug may vary considerably but I find it very satisfactory in practice to extend it for about one-third of the periphery of the wheel and to locate its middle point directly opposite to the position of the valve stem.

The mode of operation of my device is as follows: To attach a tire, the retaining flange being removed, the tire is applied to the fixed portion of the rim and made to engage closely with the permanent flange. The removable ring is then forced into the groove upon one side of the rim and gradually sprung into position. The tire is then inflated in the usual manner. To remove the tire it is first wholly or partly deflated. One side of the retaining flange is then forced inwardly and downwardly into the groove. The opposite side of the ring will then project slightly beyond the outer wall of the groove, and by pulling upon this portion the whole ring can easily be sprung off from the rim, its shape being slightly distorted. The tire can thereupon be removed.

When the valve stem clip and the filling lug are used, the tire is deflated and the valve-stem loosened by loosening the dust cap. The clip is thus forced upward sufficiently to permit the flange-ring to be forced inward and downward into the groove. The ring is of course forced into the groove at a point near the position of the valve stem and opposite to the "filling lug" both in applying and removing it.

My device is of course, subject to many modifications without departing from the spirit of my invention. I do not therefore wish to be understood as limiting myself to the precise details of the practical embodiment which I have described and shown but wish to cover the invention broadly as set forth in the claims.

Having thus described my invention what I claim is:

1. In a vehicle wheel rim, the combination of a tire-seating member having an annular groove along one edge thereof, a tire-retaining member comprising a removable endless ring adapted to enter said groove, a filling lug lying within said groove for a portion of its length, and means applied to said tire-seating member at a point diametrically opposite said lug for preventing the descent of said ring into said groove.

2. In a vehicle wheel rim the combination of an endless removable tire retaining flange, an annular groove along one edge of said rim and a filling lug lying within said groove for a portion only of its length and partially filling the same; substantially as described.

3. In a vehicle wheel rim, the combination of a tire-seating member provided with a groove along one edge thereof, a removable, endless, tire-retaining flange, a filling lug lying within said groove for a portion of its length, and a clip applied to said tire-seating member at a point diametrically opposite said filling lug.

4. In a vehicle wheel rim the combination with a tire-seating member provided with an annular groove along one edge, and a removable endless tire-retaining flange, of means for preventing the disengagement of the removable flange at one point consisting of a clip mounted upon the stem of the tire valve and means for limiting the descent of the removable flange into the groove for a portion of its length, said means consisting of a filling lug lying within the groove.

5. In a vehicle wheel rim the combination with a grooved tire-seating member and a removable, endless tire-retaining ring capable of distortion and having an inner diameter less than the diameter of the circle formed by the edge of the outside wall of said groove, of discontinuous means for limiting the descent of the removable ring into the groove, said means being located at two opposite points upon the periphery of the wheel.

6. In a vehicle wheel rim the combination with a tire seating member having an annular groove along one edge thereof and a removable, endless tire-retaining ring capable of distortion and having an inner diameter less than the diameter of the circle formed by the edge of the outside wall of said groove, of means for limiting the descent of the removable ring into the groove for a portion of the peripheral length of said groove, said means consisting of a filling lug partially filling said groove for a portion of its length only substantially as set forth.

JOHN R. GAMMETER.

Witnesses:
WALTER K. MEANS,
ARTHUR E. DAVISON.